June 7, 1960  S. MACHLANSKI  2,939,319
FLOW METER
Filed June 10, 1954  3 Sheets-Sheet 1
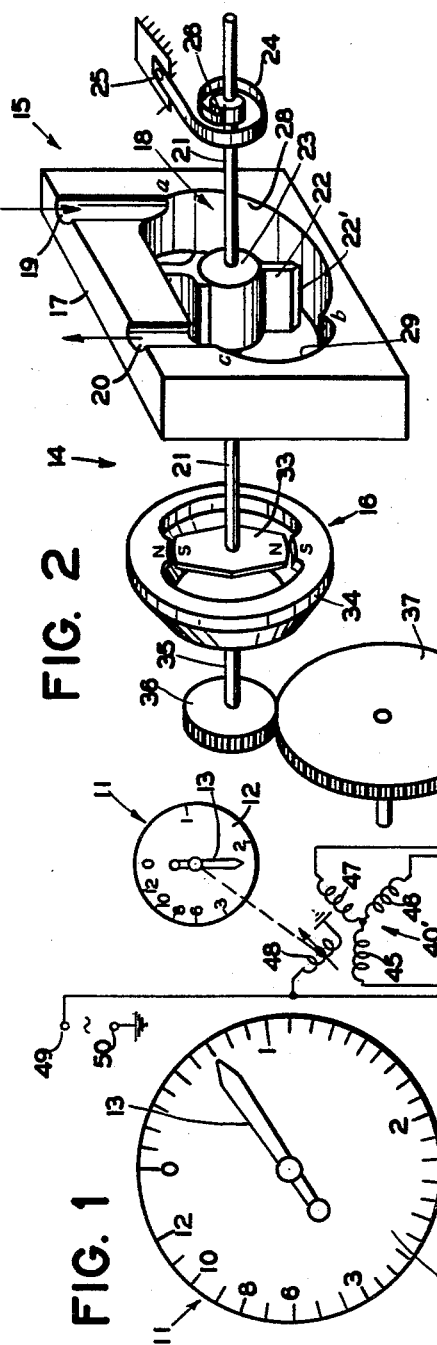
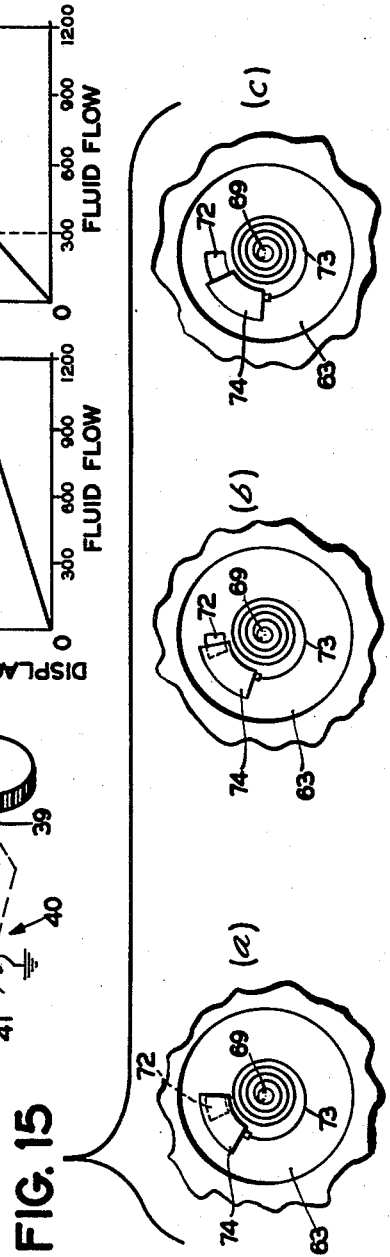
INVENTOR.
SIGMUND MACHLANSKI
BY Tyler S Roundy
ATTORNEY June 7, 1960   S. MACHLANSKI   2,939,319
FLOW METER Filed June 10, 1954   3 Sheets-Sheet 2

INVENTOR.
SIGMUND MACHLANSKI
BY
Tyler S Roundy
ATTORNEY

June 7, 1960  S. MACHLANSKI  2,939,319
FLOW METER

Filed June 10, 1954  3 Sheets-Sheet 3

INVENTOR.
SIGMUND MACHLANSKI
BY
Tyler S Roundy
ATTORNEY

_United States Patent Office_

2,939,319
Patented June 7, 1960

2,939,319

FLOW METER

Sigmund Machlanski, Glendora, Calif., assignor to Bendix Aviation Corporation, Teterboro, N.J., a corporation of Delaware Filed June 10, 1954, Ser. No. 435,763

3 Claims. (Cl. 73—228)

The present invention relates to fluid flow responsive apparatus and more particularly to apparatus for sensing or measuring fluid flow. The present invention relates especially to apparatus for sensing or measuring mass fluid flow and particularly mass fuel flow.

Heretofore, fluid flow meters of various types have been devised having an output displacement vs. fluid flow characteristic which follows the same one law, whether linear or non-linear, over the total range of fluid flow for which the flowmeter is calibrated. That is, the curve relating output displacement with fluid flow does not experience an abrupt change in slope at some intermediate value of fluid flow between minimum and maximum flow. The associated indicator is calibrated, linearly or non-linearly as the case may be, so as to conform to said one law. One difficulty with this arrangement is that the sensitivity is substantially the same over the entire range of fluid flow and the dial indication presented to the observer cannot be read with substantially any greater accuracy in one working portion of the total range of fluid flow than in another working portion of the total range of flow. This limitation becomes particularly significant in fuel flow indicating systems for modern aircraft. In modern aircraft it has recently been found desirable to provide a single dial and pointer which not only covers the total range of fuel flow but also is capable of presenting an expanded indication over a selected portion of the total range of flow without first requiring the pilot to make a preliminary manual range adjustment or range-switching operation. The present invention is believed to provide the first successful solution to this troublesome problem and its many ramifications.

Another difficulty experienced in apparatus for sensing or measuring mass fluid flow occurs when the fluid is subject to relatively wide variations in temperature resulting in substantial variations in the specific gravity or density of the fluid. In order to obtain a true indication of mass fluid flow which is free of density errors apparatus must be provided which by its inherent operation takes into account changes in specific gravity or density caused principally by changes in temperature or composition of the fluid.

The present invention is also concerned with the problem of abnormal pressure build-up in a flowmeter of the variable-orifice type or of the type employing a rotatable or angularly displaceable flow sensing device.

It is an object of the present invention to provide improved fluid flow responsive apparatus in which the aforementioned limitations and difficulties are avoided or substantially eliminated.

It is another object of the present invention to provide improved fluid flow responsive apparatus.

It is another object of the present invention to provide fluid flow sensing or measuring apparatus which has a greater sensitivity or deflection rate for one portion of the total range of fluid flow than for another portion of the total range of fluid flow.

It is another object of the present invention to devise apparatus for sensing or measuring fluid flow capable of providing usable output intelligence such as an output displacement which follows one law over part of the range of values of fluid flow and which follows a different law over another part of said range.

It is another object of the present invention to provide apparatus for sensing or measuring fluid flow wherein a rotatable fluid flow sensing device experiences a greater rotation per unit change in fluid flow in one range of fluid flow than in another range of fluid flow.

It is a further object of the present invention to provide apparatus for measuring fluid flow wherein the indicator dial has an expanded scale portion corresponding to the lower portion of the total range of fluid flow and the fluid flow sensing means has an angularly displaceable device which turns an output shaft in response to fluid flow and for a given change in fluid flow the shaft is angularly displaced farther in the lower fluid flow range than in the upper fluid flow range.

It is a further object of the present invention to provide apparatus, particularly of the variable-orifice type or of the type employing a rotatable or angularly displaceable fluid flow sensing device, for sensing or measuring substantially the true mass rate of flow of a fluid so as to substantially avoid specific gravity or density errors notwithstanding the fact that the fluid experiences relatively wide variations in temperature or composition which correspondingly vary the specific gravity and density of the fluid.

It is a further object of the present invention to provide unique means for relieving abnormal pressure build-up in a flowmeter of the variable-orifice type or of the type employing a rotatable or angularly displaceable flow sensing device.

The foregoing and other objects and advantages of the present invention will appear more fully hereinafter from a consideration of the detailed description which follows, taken together with the accompanying drawings wherein certain forms of the invention are illustrated by way of example. It is to be expressly understood, however, that the drawings are for illustration purposes only and are not to be construed as defining the limits of the invention.

In the drawings where like reference numerals refer to like parts,

Fig. 1 is an enlarged front view of a dial having an expanded lower range scale portion for indicating the fluid flow sensed by metering means such as that illustrated in Fig. 2;

Fig. 2 is a simplified diagrammatic illustration of one form of apparatus for measuring fluid flow in accordance with the present invention;

Fig. 3 represents the output displacement vs. fluid flow characteristic for a conventional flowmeter;

Fig. 4 represents the output displacement vs. fluid flow characteristic for one form of flowmeter in accordance with the present invention;

Fig. 15 is a view along the line 15—15 of Figs. 5 and 10 and illustrates in greater detail applicant's novel temperature compensation arrangement under three different temperature conditions.

Figure 10:
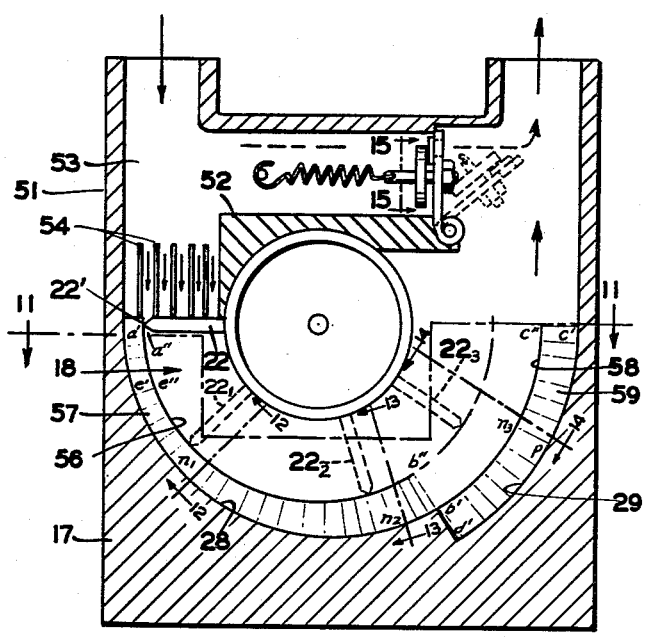
Fig. 10 is a detailed view of a preferred form of flowmeter in accordance with the present invention as seen from the output side thereof and shown partially in section.

Turning now to Figs. 1 and 2, there is provided a fluid flow indicator 11 comprising a dial 12 and an associated pointer 13. Let it be assumed by way of example that it is desired to measure the mass rate of flow of fuel to an aircraft engine where the total range of fuel flow is from zero to 1200 pounds per hour and that it is desired to obtain a more sensitive or expanded indication in the lower range between zero and 300 pounds per hour than in the upper range between 300 and 1200 pounds per hour. As shown best in Fig. 1 dial 12 has an expanded scale portion for the lower flow range between zero and 300 pounds per hour as compared with the scale portion for the upper flow range between 300 and 1200 pounds per hour, the dial space in the expanded lower scale portion for a given increment of fluid flow being eight times greater than the dial space in the upper scale portion for the same increment of fluid flow. By employing a double-range flowmeter in accordance with the present invention as hereinafter described, pointer 13 is arranged to be displaced eight times farther per unit change in fluid flow in the 0–300 lower range than it is displaced per unit change in fluid flow in the 300–1200 upper range, thus providing the desired expanded indication in the lower range as will be described in greater detail hereinafter.

In Fig. 3 there is shown the relationship between output displacement and fluid flow for a conventional flowmeter. It will be noted that the curve has a constant slope so that the sensitivity obtained is no greater in one portion of the total flow range than in another portion. In contrast, there is shown in Fig. 4 the relationship between output displacement and fluid flow for one form of flowmeter in accordance with the present invention. It will be observed that this relationship follows one linear law of relatively steep constant slope in the lower flow range between zero and 300 pounds per hour and abruptly changes to follow a different linear law of a less steep constant slope involving a different proportionality constant in the upper flow range. For purposes of illustration the ratio of the two slopes has been shown less than eight to one.

Turning to Fig. 2 there is designated generally at 14 a fuel flow transmitter including one basic form of fuel flowmeter 15 (shown cut vertically in half) in accordance with the present invention and a conventional magnetic coupling device 16. Flowmeter 15 comprises a housing 17 having a chamber 18 formed therein and provided with a fuel inlet port 19 and a fuel outlet port 20. Ports 19 and 20 are adapted for connection in series with an associated fuel conduit supplying fuel from a fuel source to an associated engine in the aircraft. Inlet port 19 receives fuel from the fuel source and outlet port 20 provides an exit for passage of the fuel to the associated engine.

Eccentrically mounted on a shaft 21 within chamber 18 is a vane 22. The vane is fixedly attached to the shaft by means of a hub 23 which, upon rotation, slides over a curved portion of the housing 17. A spiral calibration spring 24, having one end 25 fixed in position and the other end 26 secured to shaft 21, serves to bias the shaft and vane in a counter-clockwise direction so that when there is zero or minimum flow through port 19 the tip end $22^1$ of the vane will be located adjacent to a point $a$ on the curved wall surface 28 of chamber 18. When fuel enters port 19 at an increasing rate the vane and shaft are displaced in a clockwise direction from point $a$ towards point $b$ on surface 28, surface 28 being contoured in a spiral or spiral-like manner so that the separation distance and hence the radial clearance area between the tip end of the vane and surface 28 increases progressively as the vane is moved closer to point $b$. In this manner the angular displacement of the vane from its zero position opposite point $a$ is made directly proportional to the rate of flow. When the rate of flow is 300 pounds per hour for example, the vane and shaft 21 will be displaced so that the vane is located adjacent to point $b$.

Figure 5:
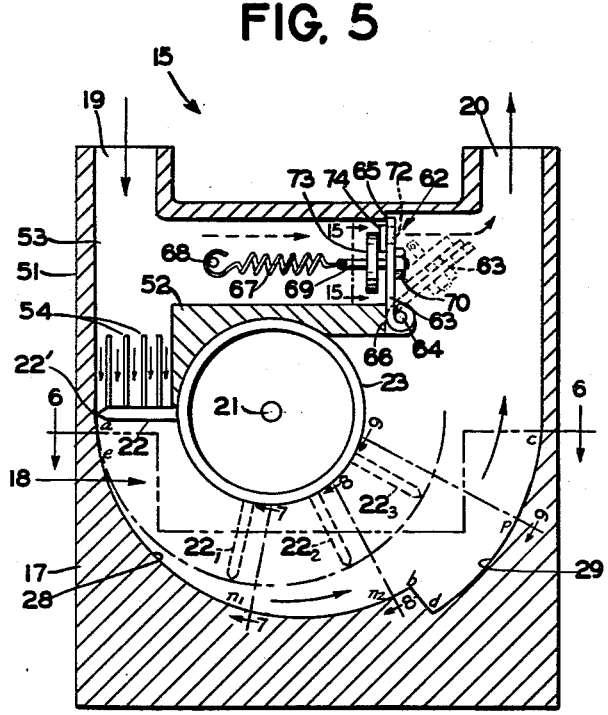
Fig. 5 is a more detailed view of the flowmeter of Fig. 2 as seen from the output side thereof and shown partially in section.

Further increase in the rate of flow will cause the vane to be displaced beyond point $b$ along the curved wall surface 29 towards point $c$, surface 29 being contoured in a spiral or spiral-like manner similar to surface 28 so that the separation distance and hence the radial clearance area between the tip end of the vane and surface 29 progressively increases as the vane is moved from point $b$ to point $c$. In this manner the angular displacement of the vane and shaft 21 is again made directly proportional to the rate of flow, and when the flow is maximum at 1200 pounds per hour for example, the vane will be displaced so as to be located adjacent to point $c$. However, as shown in Figs. 2 and 5, all of the points along surface 29 between points $b$ and $c$ are located at a greater distance from the tip end of the vane when it is adjacent such points than are the points between points $a$ and $b$ on surface 28. By virtue of this difference between surfaces 28 and 29 the change in angular position or displacement of the vane per unit change in fluid flow in the lower flow range between zero and 300 pounds per hour is made eight times greater than its change in angular position or displacement per unit change in fuel flow in the upper flow range between 300 and 1200 pounds per hour.

Fixed to shaft 21 is magnet 33 of the magnetic coupling follow-up device 16. Magnet 33 is disposed inside a generally ring-shaped magnet 34 for angular displacement with respect to the poles of magnet 34 so that magnet 34 is angularly displaced in response to angular displacement of shaft 21. In applications where faster response and minimum hunting are desired magnets 33 and 34 may be reversed in position so that shaft 21 drives magnet 34 and the latter drives magnet 33. One advantage of employing a magnetic coupling device is that shaft 21 may be terminated inside the flowmeter housing 17 and the output load on the flowmeter may be physically isolated from the flowmeter itself and an hermetic seal preserved. This is accomplished by inserting a non-magnetic wall portion of the housing 17 between the two magnets to seal hermetically shaft 21 and its attached magnet inside the housing of the flowmeter. One end of a shaft 35 is fixed to magnet 34 to be driven thereby and the other end of the shaft carries a pinion gear 36 in driving engagement with a gear 37.

Gear 37 is arranged to drive a pinion gear 38 which is fixed to the rotor shaft 39 of an inductive synchro transmitter 40 so that the rotor of synchro 40 is displaced as a linear function of the displacement of vane 22. Assuming that the entire range of angular displacements for the vane 22 is 175°, then the vane will be displaced clockwise from point $a$ to point $b$ through an angle of 127.27° when the flow increases in the lower range from zero to 300 pounds per hour and will be displaced from point $b$ to point $c$ through an additional angle of 47.73° when the flow increases into the upper range from 300 to 1200 pounds per hour. Assuming, for example, that gears 36, 37, and 38 are of relative size to provide a step-up ratio of approximately one-to-two between shafts 21 and 39, the rotor of synchro transmitter 40 will be displaced from an equilibrium or null position through an angle of 240° when the flow increases from zero to 300 pounds per hour and through an additional angle of 90° when the flow increases into the upper range from 300 to 1200 pounds per hour. In this manner the rotor of synchro transmitter 40 is angularly displaced eight times farther per unit change in fuel flow in the lower range than it is displaced per unit change in fuel flow in the upper range.

The inductive synchro transmitter device 40 forms part of a self-synchronous electrical follow-up system which includes an inductive synchro follow-up device 40 and the fuel flow indicator 11. The use of a magnetic coupling device in combination with a condition-sensing device and self-synchronous electrical follow-up system is described and claimed in U.S. Patent No. 2,242,126 to B. B. Holmes and W. A. Reichel, granted May 10, 1941, and assigned to the same assignee as the present application. Synchro transmitter 40 has a rotor winding 41 and so-called three-phase secondary windings 42, 43 and 44 which are connected back-to-back in the conventional manner to the corresponding three-phase primary stator windings 45, 46 and 47 of synchro follow-up device $40^1$. The rotor windings 41 and 48 of synchro devices 40 and $40^1$, respectively, are adapted to be energized by connection across a pair of terminals 49, 50 which in turn are supplied from a source of alternating voltage (not shown). The rotor of synchro follow-up device $40^1$ is drivably coupled to the indicator pointer 13 so that the pointer indicates zero flow when the rotor is in a null or zero position corresponding to the null position of the rotor of transmitter 40 for zero fuel flow through the conduit.

In a manner well understood in the art, angular displacement of the rotor of transmitter device 40 changes the magnitudes of the voltages induced in stator windings 42, 43 and 44 which is communicated to the corresponding stator windings 45, 46 and 47 of follow-up device $40^1$ so as to displace the resultant field therein and cause a proportional follow-up displacement of the rotor of device $40^1$. As shown in Fig. 1, the dial space on the lower-range linearly calibrated scale portion for a given increment of fluid flow is eight times greater than the dial space on the upper-range linearly calibrated scale portion for the same increment of fluid flow. Since the rotor of follow-up device $40^1$ is angularly displaced eight times farther per unit change in flow in the lower range than in the upper range, the pointer 13 will give the desired expanded indication over the lower range. That is, the pointer is eight times more sensitive in the lower range than it is in the upper range.

Figs. 5 to 9 show in greater detail the novel dual-range flowmeter 15 of Fig. 2. Fig. 5 is a view, partially in section with a side wall portion removed, of the flowmeter of Fig. 2 as seen from its output side with the vane in its reference angular position corresponding to zero fuel flow. The end wall portion 51 and portion 52 define the interior part of inlet port 19 and serve to direct the fluid against vane 22. There are also preferably provided several parallel guide vanes 54 which are secured to the side wall portion 53 of the housing 17 and serve to remove or compensate for any turbulence in the incoming fuel and to direct the fuel in a direction generally normal to the vane in its reference position. The hub 23 is preferably hollow so as to have minimum mass and has a base or rib portion secured to shaft 21 which is mounted for rotation in suitable bearings (not shown).

Figure 7:
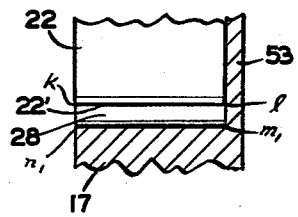
Fig. 7 is a partial sectional view along the line 7—7 of Fig. 5 and shows the clearance area between the rotatable device and housing for an angular position of the device corresponding to an intermediate magnitude of fluid flow in the lower range of fluid flow.

When the fuel flow increases from zero to an intermediate value, for example 180 pounds per hour, in the lower flow range, the vane will be displaced to an intermediate angular position as indicated by the dotted lines $22_1$ in Fig. 5. As shown in Fig. 7 the radial separation or clearance distance $kn_1$ or $lm_1$ and the radial clearance area $klm_1n_1$ between surface 28 and the tip end $22^1$ of the vane is relatively small for such intermediate position of the vane. When the fuel flow increases to a higher value, for example 250 pounds per hour, in the lower flow range, the vane will be displaced still farther away from its reference position to a more advanced position as indicated by the dotted lines $22_2$, and as shown in Fig. 8 the radial clearance distance $kn_2$ or $lm_2$ and the radial clearance area $klm_2n_2$ between surface 28 and the tip end $22^1$ of the vane are larger than for the vane position shown in Fig. 7.

Figure 8:
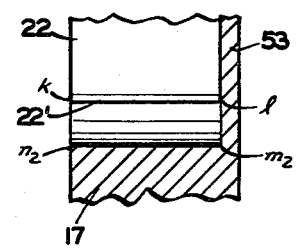
Fig. 8 is a partial sectional view along the line 8—8 of Fig. 5 and shows the clearance area between the rotatable device and housing for an angular position of the device corresponding to a greater magnitude of fluid flow in the lower flow range.
Figure 6:
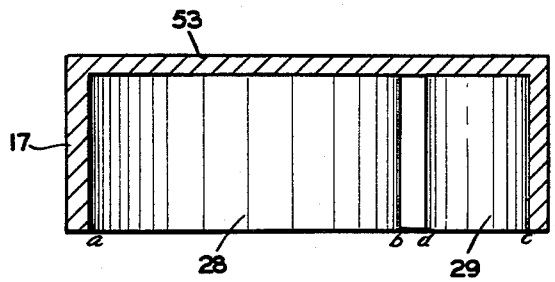
Fig. 6 is a transverse sectional view along the line 6—6 of Fig. 5.
Figure 9:
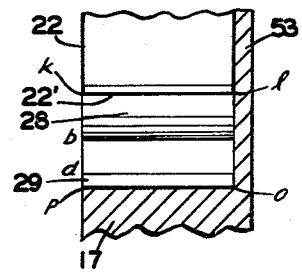
Fig. 9 is a partial sectional view along the line 9—9 of Fig. 5 and shows the clearance area between the rotatable device and housing for an angular position of the device corresponding to an intermediate magnitude of fluid flow in the upper range of fluid flow.

When the fuel flow increases beyond 300 pounds per hour to an intermediate value, for example 800 pounds per hour, in the upper flow range, the vane will be displaced to an intermediate angular position opposite surface 29 as indicated by the dotted lines $22_3$, and as shown in Fig. 9 the radial clearance distance $kp$ or $lo$ and the radial clearance area $klop$ between surface 29 and the tip end of the vane is substantially greater than for the vane positions shown in Figs. 7 and 8.

As previously indicated surfaces 28 and 29 are contoured or profiled radially in a substantially spiral or spiral-like manner so that the radial clearance distance and radial clearance area between the vane tip and surfaces 28 and 29, respectively, for each successive angular position of the vane in the lower and upper ranges are substantially directly proportional to the mass rate of fuel flow. However, the proportionality constant differs for the two ranges. The change in clearance area per unit change in fuel flow is substantially eight times greater in the upper flow range between 300 and 1200 pounds per hour than in the lower range between zero and 300 pounds per hour. As indicated the calibration spring 24, which biases the vane and shaft 21 to the zero or reference position when the fuel flow is zero, has a substantially linear deflection vs. restraining force characteristic of the same one constant slope over the combined lower and upper ranges of vane positions. As the fuel flow increases, for example, from one value to a higher value in the lower flow range, and then becomes constant at the new higher value, the force or torque exerted by the fluid on the vane will progressively increase, and hence progressively increase the angular position of the vane, until the radial clearance area and the rate of fuel by-pass under tip $22^1$ have increased to a point where the force of the fuel on the vane equals the greater restraining force of spring 24, at which time the vane comes to rest at a new equilibrium position. This new angular position of the vane relative to its zero reference position is directly proportional to said new value of mass flow rate. Because of the proportionately larger change in clearance area in the upper flow range, the change in the force or torque exerted by the fluid on the vane per unit change in fuel flow is eight times greater in the lower flow range than in the upper flow range.

In Figs. 10–14 there is illustrated a preferred form of flowmeter which is similar in construction and operation to the flowmeter of Figs. 2 and 5 except for the differences about to be described. In Fig. 10 the housing is provided with surfaces which are contoured or profiled in a radial spiral-like manner and also in an axial spiral-like manner. Such two-way contouring affords a more compact arrangement for a given total range of fluid flows and also has been found in some constructions to provide a greater sensitivity and also a greater inherent correction for changes in fuel density due to changes in fuel composition. Fig. 10 is a view similar to Fig. 5 with a side wall portion removed. It will be observed in Fig. 10 that surfaces $28^1$ and $29^1$ are each contoured in a substantially radial spiral or spiral-like manner so that the radial clearance distance between the vane tip $22^1$ and surfaces $28^1$ and $29^1$, respectively, progressively increases for each progressive increase in angular position of the vane in the lower and upper ranges corresponding to each progressive increase in fuel flow. In addition, it will be observed that surfaces $28^1$ and $29^1$ are each contoured or profiled axially in a substantially spiral or spiral-like manner in a direction generally parallel to the axis of shaft 21 so that the axial dimension $kl$, $nm$ or $po$ of the radial clearance area between vane tip $22^1$ and surface $28^1$ and surfaces 58 and $29^1$, respectively, progressively increases for each progressive increase in angular position of the vane in the lower and upper ranges. Surface 58 is an extension of surface $28^1$ and occupies the upper flow range. Surface 56 is substantially cylindrical and makes sliding contact with the tip end $22^1$ of the vane as the latter sweeps between point $a''$ and point $b''$ where surface 56 converges on the side wall portion 53. The surfaces of the flowmeter of Fig. 10 are contoured radially and axially so that the progressively increasing clearance area between the vane tip $22^1$ and the housing, corresponding to the progressively increasing angular positions of the vane from its reference position, varies in substantially direct proportion to the progressively increasing mass rate of fuel flow from zero flow to the maximum flow of 1200 pounds per hour; and the force or torque exerted by the fuel on the vane for each of the vane positions similarly varies in substantially direct proportion to the mass fuel flow rate. However, the proportionality constant differs for the two ranges. The change in clearance area per unit change in fuel flow is substantially eight times greater in the upper flow range between 300 and 1200 pounds per hour than in the lower range between zero and 300 pounds per hour. Due to the proportionately larger change in clearance area in the upper flow range, the change in the force or torque exerted by the fluid on the vane per unit change in fuel flow is eight times greater in the lower flow range than in the upper flow range.

Figure 12:
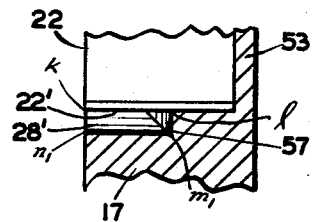
Fig. 12 is a partial sectional view along the line 12—12 of Fig. 10 and shows the clearance area between the rotatable device and housing for an angular position of the device corresponding to an intermediate magnitude of fluid flow in the lower range of fluid flow.
Figure 13:
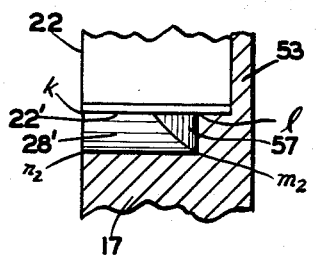
Fig. 13 is a partial sectional view along the line 13—13 of Fig. 10 and shows the clearance area between the rotatable device and housing for an angular position of the device corresponding to a greater magnitude of fluid flow in the lower flow range.

When the fuel flow increases from zero to an intermediate value in the lower flow range, the vane will be displaced to an intermediate angular position proportional to the mass flow rate as indicated by the dotted lines $22_1$ in Fig. 10. As shown in Fig. 12 the radial dimension $kn_1$ or $lm_1$ and the axial dimension $kl$ or $n_1m_1$ of the radial clearance area $klm_1n_1$ between surface $28^1$ and the tip end $22^1$ of the vane are relatively small for such intermediate vane position, and hence the radial clearance area itself is relatively small. When the fuel flow increases to a higher value in the lower flow range, the vane will be displaced still farther away from its reference position to a more advanced position proportional to mass rate of flow as indicated by the dotted lines $22_2$, and as shown in Fig. 13 the axial dimension $kl$ or $n_2m_2$ of the radial clearance area $klm_2n_2$ is relatively larger, as is the radial clearance area itself.

Figure 14:
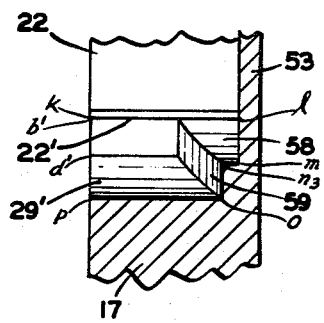
Fig. 14 is a partial sectional view along the line 14—14 of Fig. 10 and shows the clearance area between the rotatable device and housing for an angular position of the device corresponding to an intermediate magnitude of fluid flow in the upper range of fluid flow.

When the fuel flow increases beyond 300 pounds per hour to an intermediate value in the upper flow range, the vane will be displaced to an intermediate angular position opposite surface $29^1$ and the extension 58 of surface $28^1$ as indicated by the dotted lines $22_3$. As shown in Fig. 14 the radial clearance area is now $klm_3n_3op$ and the average of the radial dimension $lm_3$ between the vane tip and surface 58 and the radial dimension $kp$ between the vane tip and surface $29^1$ is greater than the radial clearance distances for the vane positions of Figs. 12 and 13. Similarly, the average of the axial dimension $kl$ and the axial dimension $po$ is greater than the axial dimensions of the clearance areas for the vane positions of Figs. 12 and 13. Clearance areas have thus been provided in the upper flow range which are substantially larger than in the lower flow range, the rate of change of clearance area per unit change in fuel flow being eight times greater in the upper flow range than in the lower flow range.

In Figs. 5 and 10 unique provision is made for relieving abnormal pressure build-up in the flowmeter described. As indicated generally at 62 there is provided a gate valve including a circular plate 63 hinged on a pivot pin 64 embedded in the side wall 53 of the housing. A flanged portion 65 of the housing and the end 66 of portion 52 define a circular opening for valve 62. Under normal fuel pressure conditions inside the flowmeter on the inlet side the plate 63 is held firmly seated against portions 65 and 66 by a tension spring 67 so that, except for the temperature correction provision hereinafter described, no fuel is permitted to by-pass the vane and escape through the outlet port 20. Spring 67 has one end anchored to a pin 68 embedded in side wall 53 and the other end secured through an eyelet to one end of a pin 69. The other end of pin 69 is threaded and passes through a central aperture in plate 63 and is rigidly attached to plate 63 by means of a nut 70. The gate valve means described is compact and positive-acting. If the fuel pressure on the inlet side of the flowmeter should build up to a predetermined abnormal level, caused for example by foreign material clogging the guide vanes 54 or jamming of the vane 22 in its zero position, then the force of fuel on plate 63 will exceed the restraining force of spring 67 and cause the plate to pivot about pin 64 to the open position shown in dotted lines. The fuel is thus permitted to by-pass the vane 22 and follow the auxiliary path indicated by the dotted arrows between the inlet and outlet ports. In this manner injury to the meter is prevented and fuel flow to the associated engine is not interrupted.

In accordance with the present invention means will now be described for assuring a flowmeter response or output displacement proportional to true mass fuel flow so as to be free of density errors irrespective of the fact that the fuel being metered may experience relatively wide variations in temperature. Although the flowmeters of Fig. 2, Fig. 5 and Fig. 10 provide a response which follows the mass rate of fluid flow with an accuracy which is sufficient for most applications, the temperature correction means about to be described are desirable in those applications which require a very high order of accuracy. The temperature correction means are shown in Fig. 5, Fig. 10 and Fig. 15. As best seen in Fig. 15 the plate 63 is provided with a small aperture 72. If at least part of aperture 72 is left uncovered, then it will be seen that there is provided an auxiliary fuel flow path indicated by the dotted arrows between the inlet and outlet ports which by-passes the vane 22.

Secured by welding or other means to pin 69 is the inner end of a flat spirally wound bimetallic temperature sensing member 73. The free end of member 73 is secured by welding or other suitable means to one end of a thin arcuate cover member 74 which is held flush against plate 63 by means of bimetallic member 73. Let it be assumed that it is desirable to correct the response of the flowmeter for variations in fuel temperature over a range between +68° F. (room temperature) and −67° F. The bimetallic sensing member 73 is arranged so that at +68° F. the cover member 74 just completely covers aperture 72 as shown in Fig. 15A, and hence no fuel is permitted to by-pass the vane 22. As the temperature of the fuel progressively decreases, the sensing member 73 progressively contracts causing member 74 progressively to increase the amount of aperture 72 which is uncovered. Hence, the fuel permitted to by-pass the vane 22 progressively increases and any tendency of the vane 22 to deflect to a false higher position, for a given fuel flow into the flowmeter, is prevented. Fig. 15B illustrates the intermediate position of cover 74 for a fuel temperature intermediate the extremes of +68° F. and —67° F. When the fuel temperature reaches the lower extreme of —67° F. the sensing element 73 is arranged to position cover 74 so that aperture 72 is completely uncovered permitting maximum fuel by-pass.

While other dimensions and materials may be utilized with satisfactory results, especially good results were obtained for temperature correction over the range from —67° F. to +68° F. when the following dimensions and materials were employed. The inner and outer arcuate edges defining aperture 72 in plate 63 were located approximately 0.55 cm. and 0.80 cm., respectively, from the axis of pin 69 and the arcuate edges each subtended an angle of approximately 22°. The bimetallic sensing member 73 comprised approximately five spiral turns of a five inch bimetallic strip of material known as "Highflex 45" which may be purchased from The H. A. Wilson Company, Newark, New Jersey. The strip was of bright finish and etched on the low expansion side, the high expansion side being located on the inside. For best results the bimetal was heat-treated for approximately one hour at 650° F. in a hydrogen atmosphere. The strip was approximately 0.015 inch thick and 0.125 inch wide.

It will be appreciated that other means may be employed for controlling the position of vane 22 or other rotatable device and the size of the clearance area or by-pass area in compensation for changes in fuel density caused by changes in fuel temperature.

It is to be understood that the present invention contemplates the provision of the dual range feature of automatic dual sensitivity or dual deflection rates as applied to other rotatable or angularly displaceable or deflectable fuel flow sensing devices such as turbines and the like employed for sensing mass fuel flow. For example, within the purview of the present invention there may be provided either a vane-type mass flowmeter as described above but with only one spiral-like contoured housing surface or a mass flow-meter of the type employing an output turbine as disclosed in U.S. Patent No. 2,602,330 to P. Kollsman, Serial No. 650,844, filed February 28, 1946, granted July 8, 1952, and dual sensitivity or dual deflection rates may be imparted to the vane, or to the output turbine of the Kollsman patent, by employing special spring means to bias the vane or turbine, such spring means being operative in the lower flow range to effect the relatively fast deflection rate and relatively expanded dial indication and being operative in the upper flow range to produce the relatively slow deflection rate and relatively compressed dial indication. One such spring arrangement is disclosed in detail in United States Patent Number 2,855,887.

Other type electrical follow-up systems may be employed to provide a remote indication of fuel flow. For example, the angularly displaceable fuel flow sensing device may displace a magnet forming part of the transmitter of a second-harmonic follow-up system of the type disclosed in U.S. Patent 2,342,637, to P. F. Bechberger, Serial No. 410,343, filed September 10, 1941, granted February 29, 1944, and assigned to the same assignee as the present application. If desired, fuel flow indicator 11 may be located in the vicinity of the flowmeter and the pointer mechanically coupled to the magnetic coupling device or directly to the output shaft itself.

Figure 11:
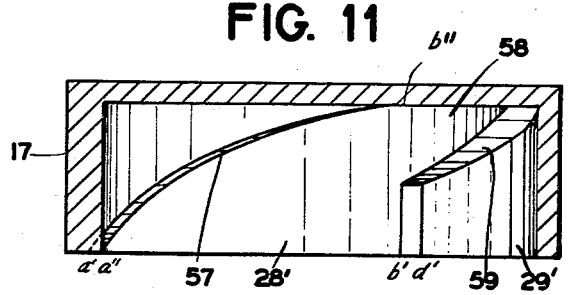
Fig. 11 is a transverse sectional view along the line 11—11 of Fig. 10.

Moreover, although the housing surfaces of the flowmeter illustrated in Fig. 5 were contoured or profiled in just a radial spiral-like manner and in Fig. 10 were contoured in both a radial spiral-like manner and also an axial spiral-like manner, it is to be understood that the present invention also contemplates a dual-sensitivity flowmeter wherein the housing surfaces are contoured or profiled in just an axial spiral-like manner similar to the axial spiral-like contouring illustrated in Fig. 11, the clearance area in the lower and upper flow ranges being substantially directly proportional to the mass rate of fluid flow and the change in clearance area per unit change in fluid flow being uniformly greater in the upper flow range than in the lower flow range. Also, it will be apparent that for certain portions of the total fluid flow range practical manufacturing considerations and empirical determinations may require certain deviations from conventional spiral forms in the radial or axial contours described above in order to obtain the desired clearance area. In addition to or in lieu of providing a clearance area between the tip end $22^1$ of vane 22 and the opposed surfaces of the housing, there may be provided a clearance area between the side edge of vane 22 and the side wall portion 53 of the housing in order to obtain the desired clearance area between the vane and housing. One such arrangement is disclosed in detail in U.S. Patent No. 2,385,901 by H. A. Williams, filed November 18, 1943, and granted October 2, 1945.

Although for the purpose of simplifying the drawings and discussion the apparatus described above has been disclosed as being accurately calibrated from zero fuel flow as the lower limit and surface 28 or $28^1$ accurately contoured from point $c$ or $c^1$ and $c^{11}$ to point $a$ or $a^1$ and $a^{11}$ with surface 29 or 29' accurately contoured over its length, it will be appreciated that in many applications it is sufficient that the calibration begin at a higher lower limit for the lower flow range, for example 50 pounds per hour, rather than at zero pounds per hour. In such applications it is sufficient that the contouring and the clearance area be made accurate from point $c$ to a point $e$ in Fig. 5 and from points $c^1$ and $c^{11}$ to points $e^1$ and $e^{11}$ in Fig. 10 corresponding to 50 pounds per hour, rather than all the way to point $a$ or points $a^1$ and $a^{11}$.

In the specification and claims the term "fluid" is to be deemed to include gaseous mixtures including solid particles suspended in a gaseous medium.

The present application is a continuation-in-part of pending application Serial No. 395,450, now Patent No. 2,874,375, filed jointly on December 1, 1953, by myself and Henry G. Elwell, Jr. which contains claims to the electrical features of apparatus including electrical totalizing apparatus especially adapted for use with the subject matter claimed in the present application. The subject matter disclosed in application Serial No. 395,450, now Patent No. 2,874,375, which is common to the present application and claimed herein, of which common subject matter I am the sole inventor, comprises a novel basic form of flowmeter, having dual sensitivity or dual deflection rates, in conjunction with its associated expanded-scale indicator.

Although certain forms of the invention of the present application have been illustrated and described in detail by way of example, it is to be expressly understood that the invention is not limited thereto. For purposes of illustration and simplification the various contours and relative dimensions have been exaggerated. Specific fluid flows, angular displacements, materials etc. have been given simply by way of example. Various changes may be made in the design and in the arrangement of parts without departing from the spirit and scope of the invention as defined by the appended claims as will now be understood by those skilled in the art.

I claim:

1. In a fluid flowmeter, a housing, a shaft, a vane mounted on said shaft for angular displacement inside said housing, means biasing said shaft and said vane to a reference angular position, and means directing the fluid to be metered into said housing against said vane to displace said vane angularly from said rerefence position against the restraining action of said biasing means, said housing being shaped so that the clearance area between said housing and the tip end of said vane for each angular position of said vane in a range of fluid flow is substantially directly proportional to the angular displacement of said vane from said reference position, said housing having a surface located along the path of travel of the tip end of said vane in said range, said surface having a substantially spiral radial contour providing a radial clearance distance between said surface and the tip end of said vane which is the radial dimension of said clearance area and which progressively increases with increase in the angular displacement of said vane from said reference position, said surface also having a substantially spiral axial contour which provides the axial dimension for said clearance area and which progresses in a direction generally parallel to the axis of said shaft.

2. In apparatus for measuring the mass flow rate of a fluid, the total range of mass flow rates including a predetermined lower range and an adjoining predetermined upper range, a housing, a shaft, a vane mounted on said shaft for angular displacement inside said housing, spring means applying a restraining force to said shaft and vane and biasing said shaft and vane to a reference angular position corresponding to minimum mass flow rate in said lower range, said spring means having a substantially linear restraining force vs. deflection characteristic of substantially constant slope over both said lower and upper ranges, means directing the fluid to be measured into said housing against said vane to displace said vane and shaft angularly from said reference position against the restraining force of said spring means, and indicating means including an index and an associated dial adapted for relative displacement with respect to each other in response to the angular displacement of said shaft, said dial having a scale portion corresponding to said upper range and linearly calibrated in units of mass flow rate and an adjoining expanded scale portion corresponding to said lower range and linearly calibrated in units of mass flow rate, said housing being shaped so that the radial clearance area between said housing and the tip end of said vane and the force exerted on said vane by the fluid for each angular position of said vane in said lower and upper ranges are substantially directly proportional to the rate of fluid flow, the change in said clearance area per unit change in rate of fluid flow being less and the change in the force exerted by the fluid on said vane per unit change in rate of fluid flow being greater in said lower range than in said upper range, said housing having first and second surfaces located along first and second portions respectively of the path of travel of the tip end of said vane, said first surface corresponding to said lower range and said second surface corresponding to said upper range, said first surface having a substantially spiral radial contour providing a radial clearance distance between said first surface and the tip end of said vane which is the radial dimension of said clearance area in said lower range and which progressively increases with increase in the angular displacement of said vane from said reference position in said lower range, said second surface having a substantially spiral radial contour offset in a generally radial direction a predetermined amount farther away from said shaft than the spiral radial contour of said first surface and providing a radial clearance distance between said second surface and the tip end of said vane which is the radial dimension of said clearance area in said upper range and which progressively increases with increase in the angular displacement of said vane from said reference position in said upper range, said first and second surfaces also each having a substantially spiral axial contour which provides the axial dimension for said clearance area in said lower and upper ranges respectively and which progresses in a direction generally parallel to the axis of said shaft.

3. In apparatus for sensing mass fluid flow, a housing defining a path for fluid flow and having inlet and outlet ports for fluid, a vane rotatable about a fixed axis within said housing and disposed in said path intermediate said ports, means biasing said vane toward a reference position in opposition to the force of fluid impinging upon said vane, said housing having auxiliary passage means formed therein connecting said ports for conducting fluid around the path in which said vane is disposed, a gate valve hinged to said housing and disposed in said auxiliary passage, and a bias spring connected to said housing and said gate valve and arranged to maintain said valve closed when the pressure differential on opposite sides of said gate is below a predetermined value, said gate valve having an opening permitting flow of fluid therethrough and having a cover member movable relatively to said gate valve opening to close said opening in different degrees, and a bimetallic element in contact with the fluid and interconnected between said housing and said cover member to move said cover member relative to said gate valve opening as an incident to fluid temperature change.

References Cited in the file of this patent

UNITED STATES PATENTS

| | | |
|---|---|---|
| 595,876 | Gay | Dec. 21, 1897 |
| 901,084 | Erwood | Oct. 13, 1908 |
| 1,965,333 | Connell | July 3, 1934 |
| 2,073,372 | Heidbrink | Mar. 9, 1937 |
| 2,097,829 | Bassler | Nov. 2, 1937 |
| 2,258,878 | Bassler | Oct. 14, 1941 |
| 2,315,185 | Boyle | Mar. 30, 1943 |
| 2,336,209 | Anderson | Dec. 7, 1943 |
| 2,385,901 | Williams | Oct. 2, 1945 |
| 2,422,762 | Williams | June 24, 1947 |
| 2,724,270 | Trekell | Nov. 22, 1955 |

FOREIGN PATENTS

| | | |
|---|---|---|
| 120,440 | Great Britain | Nov. 11, 1918 |
| 140,964 | Great Britain | Apr. 8, 1920 |
| 237,827 | Great Britain | Aug. 6, 1925 |
| 570,403 | Great Britain | July 5, 1945 |
| 745,170 | France | Feb. 7, 1933 |
| 748,247 | France | Apr. 10, 1933 |